(12) United States Patent
Lu et al.

(10) Patent No.: US 10,951,500 B2
(45) Date of Patent: Mar. 16, 2021

(54) METHOD AND APPARATUS FOR WARNING

(71) Applicant: Baidu Online Network Technology (Beijing) Co., Ltd., Beijing (CN)

(72) Inventors: Yongshuai Lu, Beijing (CN); Ronggang Luo, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/506,988

(22) Filed: Jul. 9, 2019

(65) Prior Publication Data

US 2020/0036611 A1 Jan. 30, 2020

(30) Foreign Application Priority Data

Jul. 24, 2018 (CN) .......................... 201810817136.X

(51) Int. Cl.
*H04L 12/26* (2006.01)
*G06N 3/08* (2006.01)

(52) U.S. Cl.
CPC ............ *H04L 43/062* (2013.01); *G06N 3/08* (2013.01); *H04L 43/16* (2013.01)

(58) Field of Classification Search
CPC ......... H04L 43/062; H04L 43/16; G06N 3/08; G06N 3/0454; H04W 24/06; G06Q 10/04; G06Q 50/26; G06F 9/3013; G06K 9/0085; G10L 19/06; G06T 7/001
See application file for complete search history.

(56) References Cited

U.S. PATENT DOCUMENTS

| | | | | |
|---|---|---|---|---|
| 10,108,850 | B1 * | 10/2018 | Das | G06K 9/00885 |
| 10,474,464 | B2 * | 11/2019 | Qadeer | G06F 9/3013 |
| 2017/0339022 | A1 | 11/2017 | Hegde et al. | |
| 2018/0090152 | A1 * | 3/2018 | Ichimura | G10L 19/06 |
| 2018/0181864 | A1 * | 6/2018 | Mathew | G06N 3/0454 |
| 2019/0378260 | A1 * | 12/2019 | Brauer | G06T 7/001 |

FOREIGN PATENT DOCUMENTS

| | | | |
|---|---|---|---|
| CN | 105025515 A | | 11/2015 |
| CN | 105025515 B | * | 3/2018 |
| CN | 108053080 A | * | 5/2018 |
| CN | 108053080 A | | 5/2018 |
| JP | 2017143399 A | | 8/2017 |

OTHER PUBLICATIONS

Nakatsugawa et al. (2018), "Network status change detection using deep learning", The Institute of Electronics, Information and Communication Engineers; 7 pgs.

* cited by examiner

Primary Examiner — Phirin Sam
Assistant Examiner — Louis Samara
(74) Attorney, Agent, or Firm — Lathrop GPM LLP

(57) ABSTRACT

Embodiments of the present disclosure relate to a method and apparatus for warning. A method may include: importing a real-time collected traffic data sequence into a pre-trained traffic prediction model, to obtain predicted traffic data, the traffic prediction model being used to calculate and obtain the predicted traffic data according to the real-time collected traffic data sequence; and sending, in response to a difference between the predicted traffic data and actual traffic data corresponding to time being greater than a set threshold, a warning signal.

15 Claims, 6 Drawing Sheets

METHOD AND APPARATUS FOR WARNING

CROSS-REFERENCE TO RELATED APPLICATIONS

This application claims priority to Chinese Patent Application No. 201810817136.X, filed on Jul. 24, 2018, titled "Method and apparatus for warning," which is hereby incorporated by reference in its entirety.

TECHNICAL FIELD

Embodiments of the present disclosure relate to the field of network technology, and specifically to a method and apparatus for warning.

BACKGROUND

With the development of science and technology, the transmission of information has become more and more frequent. A user may perform a data connection between various kinds of smart devices via a network, to realize the mutual transmission of the information, thereby improving the informatization level of the work and life of the user. Network traffic can reflect the state of the transmission of the information. In order to provide the user with a stable and effective service, a technician needs to effectively monitor the network traffic when the information is transmitted. At present, in most cases the traffic monitoring is to set a fixed traffic threshold, to give a warning when the traffic threshold is exceeded, so that the technician maintains the network in time.

SUMMARY

Embodiments of the present disclosure provide a method and apparatus for warning.

In a first aspect, the embodiments of the present disclosure provide a method for warning. The method includes: importing a real-time collected traffic data sequence into a pre-trained traffic prediction model, to obtain predicted traffic data, the traffic prediction model being used to calculate and obtain the predicted traffic data according to the real-time collected traffic data sequence; and sending, in response to a difference between the predicted traffic data and actual traffic data corresponding to time being greater than a set threshold, a warning signal.

In some embodiments, the traffic prediction model includes a convolutional neural network, a residual network and a fully connected layer.

In some embodiments, the importing a real-time collected traffic data sequence into a pre-trained traffic prediction model, to obtain predicted traffic data includes: inputting the real-time collected traffic data sequence into the convolutional neural network, to obtain a feature vector of the real-time collected traffic data sequence, the convolutional neural network being used to represent a corresponding relationship between the real-time collected traffic data sequence and the feature vector of the real-time collected traffic data sequence; inputting the feature vector of the real-time collected traffic data sequence into the residual network, to obtain a fused feature vector of the feature vector of the real-time collected traffic data sequence, the residual network being used to represent a corresponding relationship between the feature vector of the real-time collected traffic data sequence and the fused feature vector; and inputting the fused feature vector into the fully connected layer, to obtain the predicted traffic data of the real-time collected traffic data sequence, the fully connected layer being used to represent a corresponding relationship between the fused feature vector and the predicted traffic data.

In some embodiments, the residual network includes a deep characteristic extraction network and a surface characteristic extraction network, where the deep characteristic extraction network includes at least two convolutional layers, and an output of a previous convolutional layer in the at least two convolutional layers is used as an input of a later convolutional layer adjacent to the previous convolutional layer.

In some embodiments, the traffic prediction model is trained and obtained by: extracting sample traffic data sequences from historical data, to obtain a sample traffic data sequence set, wherein the historical data is network traffic historical data when there is no failure, and there is a set time interval between adjacent sample traffic data in each of the sample traffic data sequences; and using the sample traffic data sequences in the sample traffic data sequence set as an input, and using sample predicted traffic data corresponding to the sample traffic data sequences in the sample traffic data sequence set as an output, to train and obtain the traffic prediction model.

In some embodiments, the using the sample traffic data sequences in the sample traffic data sequence set as an input, and using sample predicted traffic data corresponding to the sample traffic data sequences in the sample traffic data sequence set as an output, to train and obtain the traffic prediction model includes: performing following training: importing sequentially the sample traffic data sequences in the sample traffic data sequence set into an initial traffic prediction model, to obtain initial predicted traffic data corresponding to the sample traffic data sequences in the sample traffic data sequence set; comparing the initial predicted traffic data corresponding to the sample traffic data sequences in the sample traffic data sequence set with sample predicted traffic data corresponding to the sample traffic data sequences, to obtain a prediction accuracy of the initial traffic prediction model; determining whether the prediction accuracy is greater than a preset accuracy threshold; and using the initial traffic prediction model as a trained traffic prediction model if the prediction accuracy is greater than the preset accuracy threshold.

In some embodiments, the using the sample traffic data sequences in the sample traffic data sequence set as an input, and using sample predicted traffic data corresponding to the sample traffic data sequences in the sample traffic data sequence set as an output, to train and obtain the traffic prediction model further includes: adjusting, in response to the prediction accuracy being not greater than the preset accuracy threshold, a parameter of the initial traffic prediction model, and continuing to perform the training.

In some embodiments, the importing sequentially the sample traffic data sequences in the sample traffic data sequence set into an initial traffic prediction model, to obtain initial predicted traffic data corresponding to the sample traffic data sequences in the sample traffic data sequence set includes: importing, for each of the sample traffic data sequences in the sample traffic data sequence set, consecutive N pieces of sample traffic data in the sample traffic data sequence into the initial traffic prediction model, to obtain initial predicted traffic data corresponding to the N pieces of sample traffic data.

In some embodiments, the comparing the initial predicted traffic data corresponding to the sample traffic data sequences in the sample traffic data sequence set with sample predicted traffic data corresponding to the sample traffic data sequences, to obtain a prediction accuracy of the initial traffic prediction model includes: using $(N+1)^{th}$ piece of sample traffic data in each of the sample traffic data sequence as the sample predicted traffic data; marking, in response to a difference between the initial predicted traffic data and the sample predicted traffic data being less than a difference threshold, the initial predicted traffic data as correct; and statisticizing a correct rate of the initial predicted traffic data corresponding to the each of the sample traffic data sequences and obtained by the initial traffic prediction model, to obtain the prediction accuracy of the initial traffic prediction model.

In a second aspect, the embodiments of the present disclosure provide an apparatus for warning. The apparatus includes: a predicted traffic data acquiring unit, configured to import a real-time collected traffic data sequence into a pre-trained traffic prediction model, to obtain predicted traffic data, the traffic prediction model being used to calculate and obtain the predicted traffic data according to the real-time collected traffic data sequence; and a warning unit, configured to send, in response to a difference between the predicted traffic data and actual traffic data corresponding to time being greater than a set threshold, a warning signal.

In some embodiments, the traffic prediction model includes a convolutional neural network, a residual network and a fully connected layer.

In some embodiments, the predicted traffic data acquiring unit includes: a first feature vector acquiring subunit, configured to input the real-time collected traffic data sequence into the convolutional neural network, to obtain a feature vector of the real-time collected traffic data sequence, the convolutional neural network being used to represent a corresponding relationship between the real-time collected traffic data sequence and the feature vector of the real-time collected traffic data sequence; a second feature vector acquiring subunit, configured to input the feature vector of the real-time collected traffic data sequence into the residual network, to obtain a fused feature vector of the feature vector of the real-time collected traffic data sequence, the residual network being used to represent a corresponding relationship between the feature vector of the real-time collected traffic data sequence and the fused feature vector; and a predicted traffic data acquiring subunit, configured to input the fused feature vector into the fully connected layer, to obtain the predicted traffic data of the real-time collected traffic data sequence, the fully connected layer being used to represent a corresponding relationship between the fused feature vector and the predicted traffic data.

In some embodiments, the residual network includes a deep characteristic extraction network and a surface characteristic extraction network, where the deep characteristic extraction network includes at least two convolutional layers, and an output of a previous convolutional layer in the at least two convolutional layers is used as an input of a later convolutional layer adjacent to the previous convolutional layer.

In some embodiments, the apparatus further includes a traffic prediction model training unit, configured to train a traffic prediction model. The traffic prediction model training unit includes: a sample acquiring subunit, configured to extract sample traffic data sequences from historical data, to obtain a sample traffic data sequence set, wherein the historical data is network traffic historical data when there is no failure, and there is a set time interval between adjacent sample traffic data in each of the sample traffic data sequences; and a traffic prediction model training subunit, configured to use the sample traffic data sequences in the sample traffic data sequence set as an input, and use sample predicted traffic data corresponding to the sample traffic data sequences in the sample traffic data sequence set as an output, to train and obtain the traffic prediction model.

In some embodiments, the traffic prediction model training subunit includes: a traffic prediction model training module, configured to import sequentially the sample traffic data sequences in the sample traffic data sequence set into an initial traffic prediction model, to obtain initial predicted traffic data corresponding to the sample traffic data sequences in the sample traffic data sequence set; compare the initial predicted traffic data corresponding to the sample traffic data sequences in the sample traffic data sequence set with sample predicted traffic data corresponding to the sample traffic data sequences, to obtain a prediction accuracy of the initial traffic prediction model; determine whether the prediction accuracy is greater than a preset accuracy threshold; and use the initial traffic prediction model as a trained traffic prediction model if the prediction accuracy is greater than the preset accuracy threshold.

In some embodiments, the traffic prediction model training subunit further includes: a parameter adjusting module, configured to adjust, in response to the prediction accuracy being not greater than the preset accuracy threshold, a parameter of the initial traffic prediction model, and continue to perform the training.

In some embodiments, the traffic prediction model training module includes: an initial predicted traffic data acquiring submodule, configured to import, for each of the sample traffic data sequences in the sample traffic data sequence set, consecutive N pieces of sample traffic data in the sample traffic data sequence into the initial traffic prediction model, to obtain initial predicted traffic data corresponding to the N pieces of sample traffic data.

In some embodiments, the traffic prediction model training module includes: a sample predicted traffic data setting submodule, configured to use $(N+1)^{th}$ piece of sample traffic data in each of the sample traffic data sequences as the sample predicted traffic data; a marking submodule, configured to mark, in response to a difference between the initial predicted traffic data and the sample predicted traffic data being less than a difference threshold, the initial predicted traffic data as correct; and a prediction accuracy acquiring submodule, configured to statisticize a correct rate of the initial predicted traffic data corresponding to the each of the sample traffic data sequences and obtained by the initial traffic prediction model, to obtain the prediction accuracy of the initial traffic prediction model.

In a third aspect, the embodiments of the present disclosure provide a server. The server includes: one or more processors; and a memory, configured to store one or more programs. The one or more programs, when executed by the one or more processors, cause the one or more processors to implement the method for warning described in the first aspect.

In a fourth aspect, the embodiments of the present disclosure provide a computer readable medium storing a computer program. The program, when executed by a processor, implements the method for warning described in the first aspect.

According to the method and apparatus for warning provided by the embodiments of the present disclosure, the real-time collected traffic data sequence is first imported into the pre-trained traffic prediction model, to obtain the predicted traffic data. When the difference between the predicted traffic data and the actual traffic data corresponding to time is greater than the set threshold, the warning signal is sent. The present disclosure may obtain the accurate predicted traffic data according to the real-time collected traffic data, thus improving the accuracy of warning.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
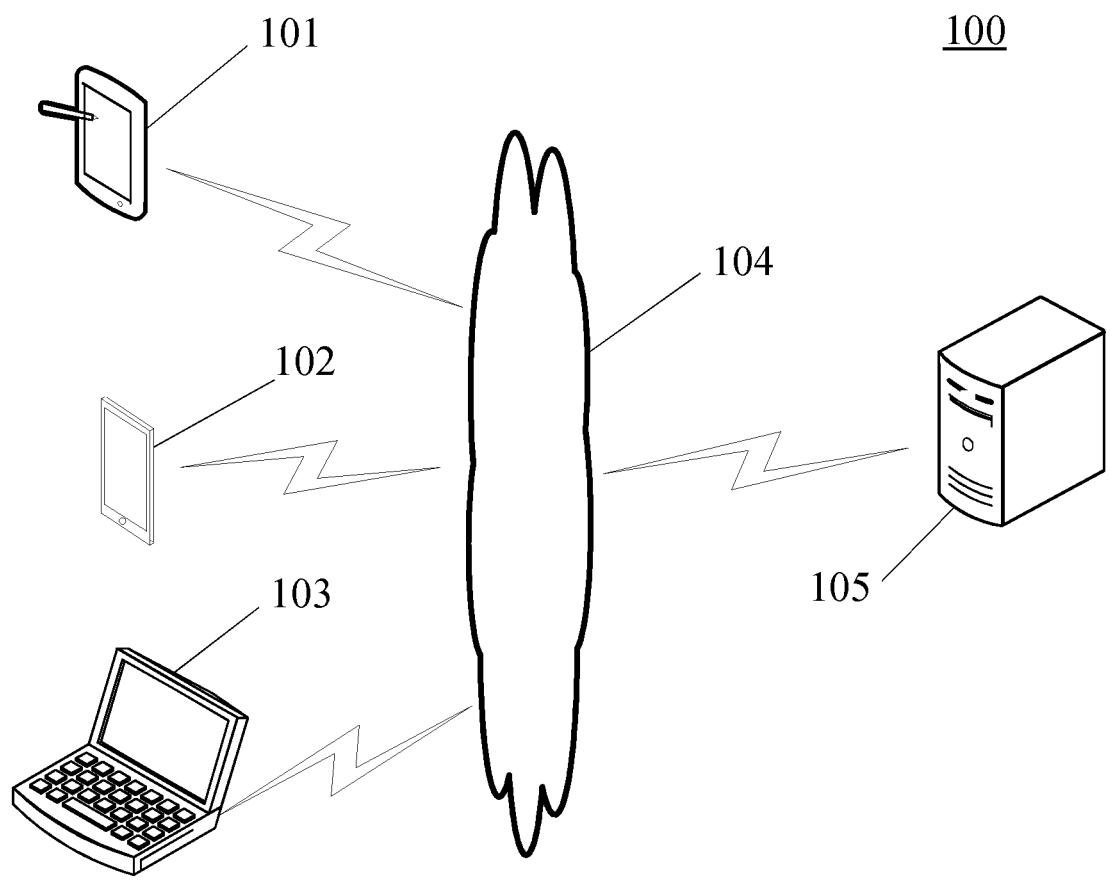
FIG. 1 is a diagram of an exemplary system architecture in which an embodiment of the present disclosure may be applied.

FIG. 1 shows an exemplary system architecture 100 in which a method for warning or an apparatus for warning according to the embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 using the terminal devices 101, 102 and 103, to cause the server 105 to monitor the network traffic of the terminal devices 101, 102 and 103. Various communication client applications (e.g., web browser applications, shopping applications, search applications, instant communication tools, mailbox clients and social platform software) may be installed on the terminal devices 101, 102 and 103.

The terminal devices 101, 102 and 103 may be hardware or software. When being the hardware, the terminal devices 101, 102 and 103 may be various electronic devices having network connection applications and supporting network data processing, which include, but not limited to, a smart phone, a tablet computer, an e-book reader, a laptop portable computer and a desktop computer. When being the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services, for example, a server monitoring the network traffic when the terminal devices 101, 102 and 103 are connected to the network 104. The server may perform monitoring on the traffic when the terminal devices 101, 102 and 103 are connected to the network, and send a warning signal when the traffic is abnormal.

It should be noted that the method for warning provided by the embodiments of the present disclosure is generally performed by the server 105. Correspondingly, the apparatus for warning is generally provided in the server 105.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

Figure 2:
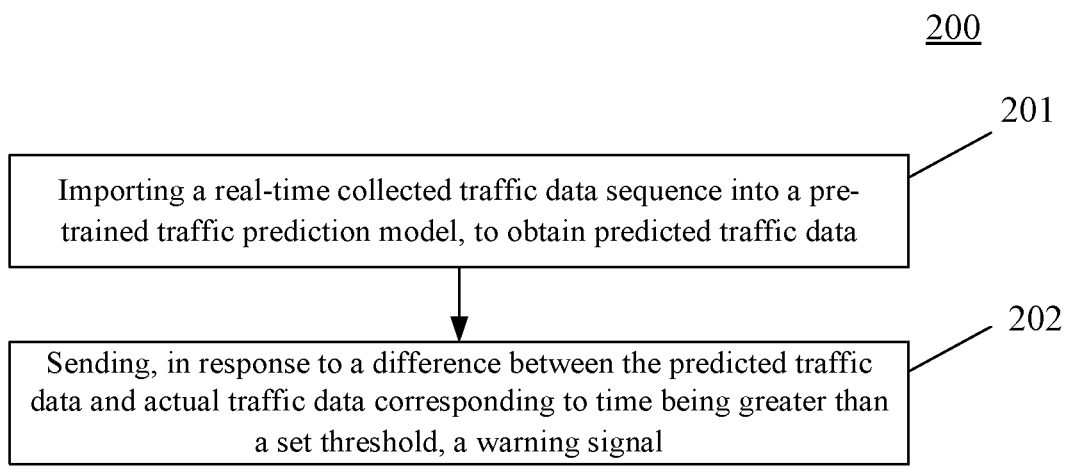
FIG. 2 is a flowchart of an embodiment of a method for warning according to the present disclosure.

Further referring to FIG. 2, a flow 200 of an embodiment of a method for warning according to the present disclosure is illustrated. The method for warning includes the following steps.

Step 201, importing a real-time collected traffic data sequence into a pre-trained traffic prediction model, to obtain predicted traffic data.

In this embodiment, an executing body (e.g., the server 105 shown in FIG. 1) of the method for warning may collect, from the terminal devices 101, 102 and 103 with which a user performs network data processing, the traffic data (i.e., network traffic data) of the terminal devices 101, 102 and 103 in real time by means of a wired connection or a wireless connection, and acquire the traffic data sequence from the traffic data. Here, the traffic data sequence may be extracted from the traffic data by setting a time interval or the like. It should be noted that the wireless connection may include, but not limited to, a 3G/4G connection, a WiFi connection, a Bluetooth connection, a WiMAX connection, a Zigbee connection, a UWB (ultra wideband) connection, and other wireless connections now known or developed in the future.

In the existing traffic warning method, a fixed traffic threshold is usually set, and warning is performed when the traffic threshold is exceeded. However, since factors such as the time the user uses the network and the network traffic of the application used by the user are different, the actual network traffic has its own regularity. At some time, the network traffic consumed by the user is very low (e.g., which may be time for rest at night), and at some time, the network traffic consumed by the user is very high (e.g., which may be work time or time after work). Therefore, if the fixed traffic threshold is set, a situation of mis-warning often occurs. In addition, it is impossible to timely discover the abnormality of the network traffic that the normally consumed network traffic is very low or the normally consumed network traffic is very high, and thus a situation of missing-warning occurs.

For this purpose, the executing body of the present disclosure first acquires the real-time traffic data of the terminal devices 101, 102 and 103. Thereafter, the executing body extracts the traffic data sequence from the traffic data. The traffic data in the traffic data sequence has a chronological order that can represent the change of the traffic over time. For example, the traffic data sequence may be: (t1, XX), (t2, XX), (t3, XX), (t4, XX), (t5, XX) . . . . Here, t may be a time point and XX is the traffic data value at the time point of t. Then, the executing body may import the traffic data sequence into the pre-trained traffic prediction model, to obtain the predicted traffic data corresponding to the traffic data sequence. Here, the traffic prediction model may be used to calculate and obtain the predicted traffic data according to the real-time collected traffic data sequence.

In this embodiment, the traffic prediction model may be an artificial neural network, which abstracts the human brain neuron network from the perspective of information processing, establishes a simple model, and forms different networks according to different connection modes. The artificial neural network is usually composed of a large number of nodes (also known as neurons) connected to each other. Each node represents a specific output function, called an activation function. The connection between every two nodes represents a weighted value, which is called a weight (also called a parameter). The output of the network varies according to the connection mode, the weighted value and the activation function of the network. The traffic prediction model often includes a plurality of layers, and each layer includes a plurality of nodes. In general, the weights of nodes in a given layer may be identical, and the weights of nodes in different layers may be different. Thus, the parameters of the plurality of layers of the traffic prediction model may also be different. Here, the executing body may input the traffic data sequence from the input side of the traffic prediction model, and output the traffic data sequence sequentially processed by the parameters of the layers in the traffic prediction model from the output side of the traffic prediction model, the processing referring to, for example, a product or a convolution. The information outputted from the output side is the predicted traffic data corresponding to the traffic data sequence.

In this embodiment, the traffic prediction model may be used to calculate and obtain the predicted traffic data according to the real-time collected traffic data sequence. The executing body may train the traffic prediction model in various ways, wherein the traffic prediction model may calculate and obtain the predicted traffic data according to the real-time collected traffic data sequence.

As an example, based on statistics on a large number of sample traffic data sequences and the sample predicted traffic data corresponding to the sample traffic data sequences, the executing body may generate a corresponding relationship table storing a plurality of corresponding relationships recording the sample traffic data sequences and the sample predicted traffic data, and use the corresponding relationship table as the traffic prediction model. In this way, the executing body may compare the real-time collected traffic data sequence with a plurality of sample traffic data sequences in the corresponding relationship table sequentially. If a sample traffic data sequence in the corresponding relationship table is identical or similar to the real-time collected traffic data sequence, the sample predicted traffic data corresponding to the sample traffic data sequence in the corresponding relationship table is used as the predicted traffic data of the real-time collected traffic data sequence.

As another example, the executing body may first acquire a plurality of sample traffic data sequences and the sample predicted traffic data corresponding to each sample traffic data sequence in the plurality of sample traffic data sequences. Then, the executing body may use the each sample traffic data sequence in the plurality of sample traffic data sequences as an input, and use the sample predicted traffic data corresponding to the each sample traffic data sequence in the plurality of sample traffic data sequences as an output, to train and obtain the traffic prediction model. Here, the executing body may acquire the plurality of sample traffic data sequences, and show them to those skilled in the art. Those skilled in the art may calculate the each sample traffic data sequence in the plurality of sample traffic data sequences based on experience, to obtain the sample predicted traffic data. The model trained by the executing body may be an initial traffic prediction model, and the initial traffic prediction model may be an untrained traffic prediction model or a traffic prediction model on which training is not completed, and each layer of the initial traffic prediction model may be provided with an initial parameter. The parameter may be continually adjusted during the training on the initial traffic prediction model. The initial traffic prediction model may be various types of untrained artificial neural networks, various types of artificial neural networks on which the training is not completed, or a model obtained by combining the untrained artificial neural networks or by combining the artificial neural networks on which the training is not completed. For example, the initial traffic prediction model may be an untrained convolutional neural network, an untrained residual network, or a model obtained by combining the untrained convolutional neural network, the untrained residual network and an untrained fully connected layer. In this way, the executing body may input the real-time collected traffic data sequence from the input side of the traffic prediction model, and output the traffic data sequence sequentially processed by the parameters of the layers in the traffic prediction model from the output side of the traffic prediction model. The information outputted from the output side is the predicted traffic data corresponding to the real-time collected traffic data sequence.

Step 202, sending, in response to a difference between the predicted traffic data and actual traffic data corresponding to time being greater than a set threshold, a warning signal.

After obtaining the predicted traffic data, the executing body may compare the predicted traffic data with the actual traffic data corresponding to time. When the difference between the predicted traffic data and the actual traffic data corresponding to time is greater than the set threshold, the warning signal is sent. For example, the real-time collected traffic data sequence includes 10 traffic data points, and each traffic data point corresponds to time points from 1 to 10. The predicted traffic data obtained by inputting the 10 traffic data points to the traffic prediction model may correspond to the time point 11. When the difference between the predicted traffic data and the actual traffic data corresponding to the time point 11 is greater than the set threshold, the actual traffic data at this time may be considered abnormal, and the executing body may send the warning signal. It may be seen from the above description that, according to the method of the present disclosure, the predicted traffic data is obtained according to the real-time collected traffic data sequence, then whether the traffic data is abnormal is determined by comparing the predicted traffic data with the actual traffic data, and then the warning signal is sent. Since the predicted traffic data is obtained according to the real-time collected actual traffic data, the actual variation trend of the traffic data may be truly and accurately reflected, thereby improving the accuracy of the warning.

Figure 3:
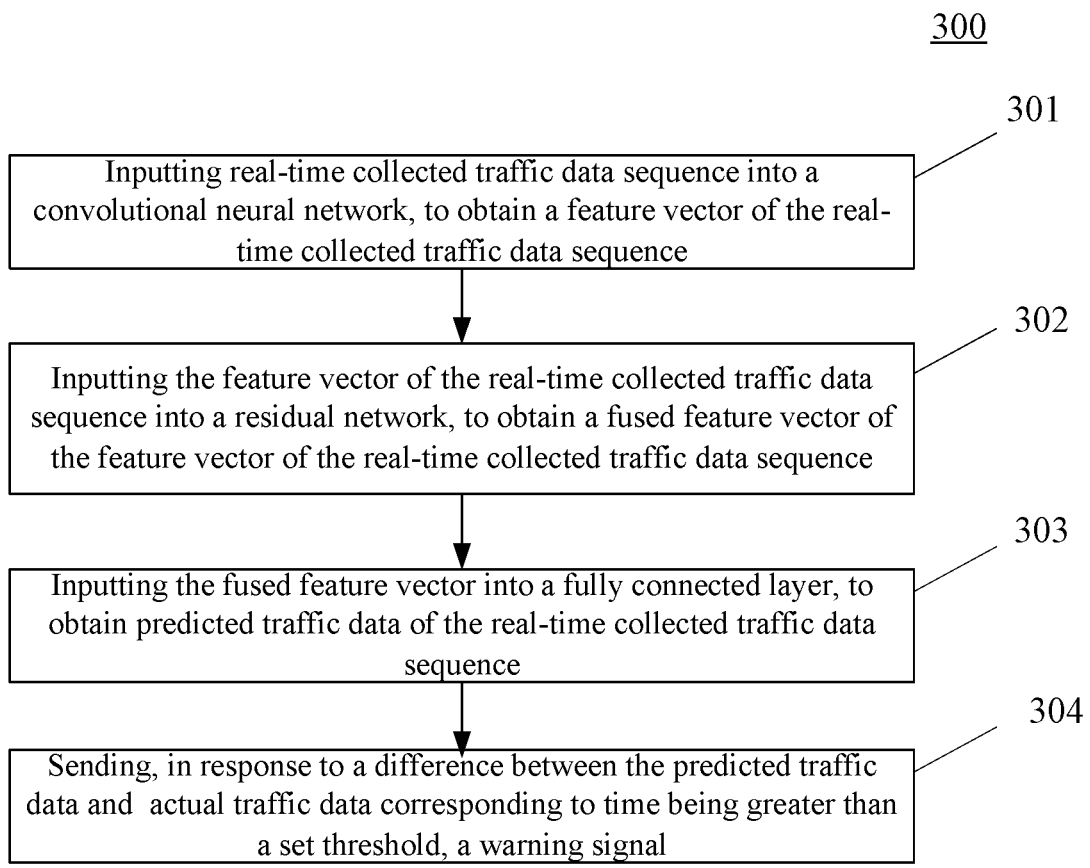
FIG. 3 is a flowchart of another embodiment of the method for warning according to the present disclosure.

Further referring to FIG. 3, FIG. 3 illustrates a flow 300 of another embodiment of the method for warning according to the present disclosure. In this embodiment, a traffic prediction model may include a convolutional neural network, a residual network and a fully connected layer. The flow 300 of the method for warning includes the following steps.

Step 301, inputting the real-time collected traffic data sequence into the convolutional neural network, to obtain a feature vector of the real-time collected traffic data sequence.

In this embodiment, the executing body may input the real-time collected traffic data sequence into the convolutional neural network, to obtain the feature vector of the real-time collected traffic data sequence. Here, the traffic data sequence may include a plurality of pieces of traffic data corresponding to time points. The feature vector of the real-time collected traffic data sequence may be used to represent a feature of the variation of the traffic data over time, for example, may be a difference between the traffic data per unit time.

In this embodiment, the convolutional neural network may be a feedforward neural network, and the artificial neurons thereof may respond to a part of the surrounding cells within the coverage area and have excellent performance in image processing. In general, the basic structure of the convolutional neural network includes two layers, one of which is a feature extraction layer. The input of each neuron is connected to the local receptive field of the previous layer, and extracts a local feature of the local receptive field. Once the local feature is extracted, the positional relationship between the feature and other features is also determined. The other of the two layers is a feature map layer, each computing layer of the network is composed of a plurality of feature maps, and each feature map is a plane. The weights of all neurons on the plane are equal. Here, the executing body may input the real-time collected traffic data sequence from the input side of the convolutional neural network, and output the traffic data sequence sequentially processed by the parameters of the layers in the convolutional neural network from the output side of the convolutional neural network. The information outputted from the output side is the feature vector of the real-time collected traffic data sequence.

In this embodiment, the convolutional neural network may be used to represent the corresponding relationship between the real-time collected traffic data sequence and the feature vector of the real-time collected traffic data sequence. The executing body may train the convolutional neural network being able to represent the corresponding relationship between the real-time collected traffic data sequence and the feature vector of the real-time collected traffic data sequence in various ways.

As an example, based on statistics on a large number of traffic data sequences and the feature vectors of the traffic data sequences, the executing body may generate a corresponding relationship table storing a plurality of corresponding relationships between the traffic data sequences and the feature vectors of the traffic data sequences, and use the corresponding relationship table as the convolutional neural network. In this way, the executing body may compare the real-time collected traffic data sequence with a plurality of traffic data sequences in the corresponding relationship table sequentially. If a traffic data sequence in the corresponding relationship table is identical or similar to the real-time collected traffic data sequence, the feature vector of the traffic data sequence in the corresponding relationship table is used as the feature vector of the real-time collected traffic data sequence.

As another example, the executing body may first acquire a sample traffic data sequence and the feature vector of the sample traffic data sequence. Then, the executing body may use the sample traffic data sequence as an input, and use the feature vector of the sample traffic data sequence as an output, to train and obtain the convolutional neural network that may represent the corresponding relationship between the traffic data sequence and the feature vector corresponding to the traffic data sequence. In this way, the executing body may input the traffic data sequence from the input side of the convolutional neural network, and output the traffic data sequence sequentially processed by the parameters of the layers in the convolutional neural network from the output side of the convolutional neural network. The information outputted from the output side is the feature vector of the traffic data sequence.

Step 302, inputting the feature vector of the real-time collected traffic data sequence into the residual network, to obtain a fused feature vector of the feature vector of the real-time collected traffic data sequence.

In this embodiment, the executing body may input the feature vector of the real-time collected traffic data sequence into the residual network, to obtain the fused feature vector. Here, the fused feature vector may be used to represent the fusion of a deep feature and a surface feature of the feature vector of the traffic data sequence.

In this embodiment, the residual network may generate a residual function according to the input of each layer in the network, so that the residual network is easier to be optimized and the number of layers in the network is greatly deepened.

In this embodiment, the residual network may be used to represent the corresponding relationship between the feature vector of the real-time collected traffic data sequence and the fused feature vector. The executing body may train a recurrent neural network being able to represent the corresponding relationship between the feature vector of the real-time collected traffic data sequence and the fused feature vector in various ways.

As an example, based on statistics on the feature vectors of the large number of traffic data sequences and the fused feature vectors, the executing body may generate a corresponding relationship table storing a plurality of corresponding relationships between the feature vectors of the traffic data sequences and the fused feature vectors, and use the corresponding relationship table as the residual network. In this way, the executing body may calculate a Euclidean distance between the feature vector of the real-time collected traffic data sequence and the feature vectors of a plurality of traffic data sequences in the corresponding relationship table. If the Euclidean distance between the feature vector of a traffic data sequence in the corresponding relationship table and the feature vector of the real-time collected traffic data sequence is less than a preset distance threshold, a fused feature vector in the corresponding relationship table that corresponds to the feature vector of the traffic data sequence is used as the fused feature vector of the feature vector of the real-time collected traffic data sequence.

As another example, the executing body may first acquire the feature vector of the sample traffic data sequence and a sample fused feature vector. Then, the executing body may use the feature vector of the sample traffic data sequence as an input, and use the sample fused feature vector as an output, to train and obtain the residual network that may represent the corresponding relationship between the feature vector of the real-time collected traffic data sequence and the fused feature vector. In this way, the executing body may input the feature vector of the real-time collected traffic data sequence from the input side of the residual network, and output the feature vector sequentially processed by the parameters of the layers in the residual network from the output side of the residual network. The information outputted from the output side is the fused feature vector.

In some alternative implementations of this embodiment, the residual network may include a deep characteristic extraction network and a surface characteristic extraction network.

To be able to accurately determine the feature of the traffic data, in this implementation the residual network may further include two relatively independent networks: the deep characteristic extraction network and the surface characteristic extraction network. That is, in the residual network, the input of the deep characteristic extraction network and the input of the surface characteristic extraction network are both the feature vector of the real-time collected traffic data sequence. The deep characteristic extraction network and the surface characteristic extraction network respectively perform data processing on the feature vector of the real-time collected traffic data sequence, to obtain respectively the deep feature vector and the surface feature vector. Here, the deep characteristic extraction network may include at least two convolutional layers for extracting the deep feature vector of the traffic data. In the at least two convolutional layers, the output of the previous convolutional layer is used as the input of the later convolutional layer adjacent to the previous convolutional layer. The surface characteristic extraction network may include only one convolutional layer for extracting the surface feature vector of the traffic data. Here, a surface feature may be variation trend information of the traffic data. The residual network may further include a convolutional layer used for fusing the deep feature vector and the surface feature vector to obtain the fused feature vector. The fused feature vector may be obtained by summing the deep feature vector and the surface feature vector, or obtained by assigning different weights to the deep feature vector and the surface feature vector respectively and then by summing the weights, which depends on actual needs.

Step 303, inputting the fused feature vector into the fully connected layer, to obtain the predicted traffic data of the real-time collected traffic data sequence.

In this embodiment, the executing body may input the fused feature vector to the fully connected layer, to obtain the predicted traffic data of the real-time collected traffic data sequence. Here, the predicted traffic data may be traffic data of next one (or more) moment corresponding to the real-time collected traffic data sequence. For example, the traffic data sequence includes the traffic data corresponding to 10 moments, and the predicted traffic data may be a prediction performed on the traffic data corresponding to the $11^{th}$ (or $12^{th}$, $13^{th}$ . . . ) moment.

In this embodiment, each node of the fully connected layer is connected to all nodes of the output layer of the recurrent neural network, for combining fused feature vectors outputted by the output layer of the residual network together. Due to the full connection characteristic of the fully connected layer, the number of the parameters of the fully connected layer is generally the largest. At the same time, after the linear transformation is performed on the fused feature vectors using the parameters of the fully connected layer, a nonlinear activation function may be added to convert the result of the linear transformation, and thus, a nonlinear factor is introduced to enhance the expression capability of the traffic prediction model. Here, the activation function may be a softmax function, and the softmax function is an activation function commonly used in the artificial neural network, which will not be described in detail herein.

In this embodiment, the fully connected layer may be used to represent the corresponding relationship between the fused feature vector and the predicted traffic data. The executing body may train the fully connected layer being able to represent the corresponding relationship between the fused feature vector and the predicted traffic data in various ways.

As an example, based on statistics on a large number of fused feature vectors and a large amount of predicted traffic data, the executing body may generate a corresponding relationship table storing a plurality of corresponding relationships between the fused feature vectors and the predicted traffic data, and use the corresponding relationship table as the fully connected layer. In this way, the executing body may calculate Euclidean distances between the fused feature vector corresponding to the real-time collected traffic data sequence and a plurality of fused feature vectors in the corresponding relationship table. If a Euclidean distance between a fused feature vector in the corresponding relationship table and the fused feature vector corresponding to the real-time collected traffic data sequence is less than a preset distance threshold, the predicted traffic data corresponding to the fused feature vector in the corresponding relationship table is used as the predicted traffic data corresponding to the real-time collected traffic data sequence.

As another example, the executing body may first acquire a sample fused feature vector and the sample predicted traffic data corresponding to the sample fused feature vector. Then, the executing body may use the sample fused feature vector as an input, and use the sample predicted traffic data corresponding to the sample fused feature vector as an output, to train and obtain the fully connected layer that may represent the corresponding relationship between the fused feature vector and the predicted traffic data. In this way, the executing body may input the fused feature vector corresponding to the real-time collected traffic data sequence from the input side of the fully connected layer, and output the fused feature vector processed by the parameters of the fully connected layer and by the activation function from the output side of the fully connected layer. The information outputted from the output side is the predicted traffic data of the real-time collected traffic data sequence.

Step 304, sending, in response to a difference between the predicted traffic data and actual traffic data corresponding to time being greater than a set threshold, a warning signal.

The content in step 304 is the same as that in step 202, which will not be repeatedly described here.

It may be seen from FIG. 3 that, as compared with the embodiment corresponding to FIG. 2, the flow 300 of the method for warning in this embodiment emphasizes the structures of the traffic prediction model and the working principle of each structure. Therefore, the scheme described in this embodiment may improve the accuracy of acquiring the feature of the traffic data, thereby implementing an accurate warning for the abnormality of the traffic data.

Figure 4:
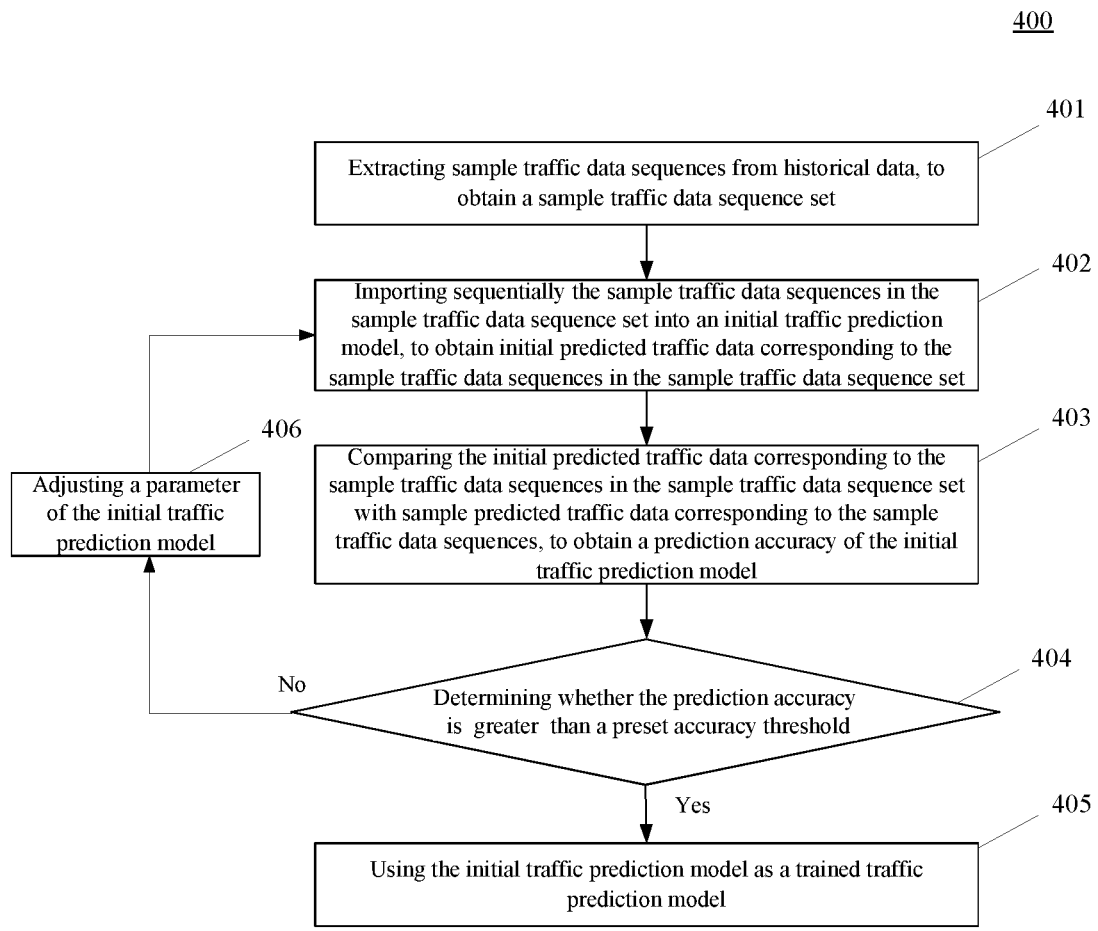
FIG. 4 is a flowchart of an embodiment of a method for training a traffic prediction model according to the present disclosure.

Further referring to FIG. 4, FIG. 4 illustrates a flow 400 of an embodiment of a method for training a traffic prediction model according to the present disclosure. The flow 400 of the method for training a traffic prediction model includes the following steps.

Step 401, extracting sample traffic data sequences from historical data, to obtain a sample traffic data sequence set.

In this embodiment, an executing body (e.g., the server 105 shown in FIG. 1) on which the method for training a traffic prediction model runs may extract the sample traffic data sequences from the historical data.

The historical data stores a variation feature of the traffic data in a situation such as a situation where there is no failure (the traffic data is normal) or a situation where there is a failure (the traffic data is abnormal). In this embodiment, the executing body may extract, from the historical data, the sample traffic data sequences in the situation where the traffic data is failure-free, and construct the sample traffic data sequence set through the sample traffic data sequences. The historical data is network traffic historical data when there is no failure, and there may be a set time interval between adjacent sample traffic data in the sample traffic data sequence.

Step 402, importing sequentially the sample traffic data sequences in the sample traffic data sequence set into an initial traffic prediction model, to obtain initial predicted traffic data corresponding to the sample traffic data sequences in the sample traffic data sequence set.

In this embodiment, based on the sample traffic data sequence set acquired in step 401, the executing body may sequentially input each sample traffic data sequence in the sample traffic data sequence set into the initial traffic prediction model, to obtain the initial predicted traffic data corresponding to the each sample traffic data sequence in the sample traffic data sequence set. Here, the executing body may input the each sample traffic data sequence from the input side of the initial traffic prediction model, and output the each sample traffic data sequence sequentially processed by the parameters of the layers in the initial traffic prediction model from the output side of the initial traffic prediction model. The information outputted from the output side is the initial predicted traffic data corresponding to the each sample traffic data sequence. Here, the initial traffic prediction model may be an untrained traffic prediction model or a traffic prediction model on which the training is not completed, and each layer of the traffic prediction model is provided with an initialization parameter. The initialization parameter may be continuously adjusted during the training on the initial traffic prediction model.

In some alternative implementations of this embodiment, the importing sequentially the sample traffic data sequences in the sample traffic data sequence set into an initial traffic prediction model, to obtain initial predicted traffic data corresponding to the sample traffic data sequences in the sample traffic data sequence set may include: importing, for each of the sample traffic data sequences in the sample traffic data sequence set, consecutive N pieces of sample traffic data in the sample traffic data sequence into the initial traffic prediction model, to obtain initial predicted traffic data corresponding to the N pieces of sample traffic data. Here, N is a positive integer.

The executing body may use the consecutive N pieces of sample traffic data in the sample traffic data sequence as an input of the initial traffic prediction model, to obtain the initial predicted traffic data of the N pieces of sample traffic data.

Step 403, comparing the initial predicted traffic data corresponding to the sample traffic data sequences in the sample traffic data sequence set with sample predicted traffic data corresponding to the sample traffic data sequences, to obtain a prediction accuracy of the initial traffic prediction model.

In this embodiment, based on the initial predicted traffic data corresponding to the each sample traffic data sequence in the sample traffic data sequence set obtained in step 402, the executing body may compare the initial predicted traffic data corresponding to the each sample traffic data sequence in the sample traffic data sequence set with the sample predicted traffic data corresponding to the sample traffic data sequence, to obtain the prediction accuracy of the initial traffic prediction model. Specifically, if the initial predicted traffic data of the sample traffic data sequence is identical or close to the sample predicted traffic data, the prediction of the initial traffic prediction model is correct. If the initial predicted traffic data of the sample traffic data sequence is different from or not close to the sample predicted traffic data, the prediction of the initial traffic prediction model is incorrect. Here, the executing body may calculate the ratio of the number of correct predictions to the total number of samples, and use the ratio as the prediction accuracy of the initial traffic prediction model.

In some alternative implementations of this embodiment, the comparing the initial predicted traffic data corresponding to the sample traffic data sequences in the sample traffic data sequence set with sample predicted traffic data corresponding to the sample traffic data sequences, to obtain a prediction accuracy of the initial traffic prediction model may include the following steps.

In the first step, the $(N+1)^{th}$ piece of sample traffic data in each of the sample traffic data sequences is used as the sample predicted traffic data.

In practice, for the accuracy of the prediction, the executing body may use the $(N+1)^{th}$ piece of sample traffic data in each of the sample traffic data sequences as the sample predicted traffic data.

In the second step, in response to the difference between the initial predicted traffic data and the sample predicted traffic data being less than a difference threshold, the initial predicted traffic data is marked as correct.

When the difference between the initial predicted traffic data of the N pieces of sample traffic data in the sample traffic data sequence and the sample predicted traffic data is less than the difference threshold, it indicates that the prediction of the initial traffic prediction model is accurate. At this time, the initial predicted traffic data may be marked as correct. Otherwise, the initial predicted traffic data may be marked as incorrect.

In the third step, the correct rate of the initial predicted traffic data corresponding to the sample traffic data sequence and obtained by the initial traffic prediction model is statisticized, to obtain the prediction accuracy of the initial traffic prediction model.

The executing body may statisticize the correct rate of the initial predicted traffic data corresponding to the sample traffic data sequence and obtained by the initial traffic prediction model, to obtain the prediction accuracy of the initial traffic prediction model.

Step 404, determining whether the prediction accuracy is greater than a preset accuracy threshold.

In this embodiment, based on the prediction accuracy of the initial traffic prediction model obtained in step 403, the executing body may compare the prediction accuracy of the initial traffic prediction model with the preset accuracy threshold. If the prediction accuracy is greater than the preset accuracy threshold, step 405 is performed. If the prediction accuracy is not greater than the preset accuracy threshold, step 406 is performed.

Step 405, using the initial traffic prediction model as a trained traffic prediction model.

In this embodiment, when the prediction accuracy of the initial traffic prediction model is greater than the preset accuracy threshold, it indicates that the training on the traffic prediction model is completed. At this time, the executing body may use the initial traffic prediction model as the trained traffic prediction model.

Step 406, adjusting a parameter of the initial traffic prediction model.

In this embodiment, in the situation where the prediction accuracy of the initial traffic prediction model is not greater than the preset accuracy threshold, the executing body may adjust the parameter of the initial traffic prediction model, and return to perform step 402 until the traffic prediction model that may calculate and obtain the predicted traffic data according to the real-time collected traffic data sequence is trained out.

Figure 5:
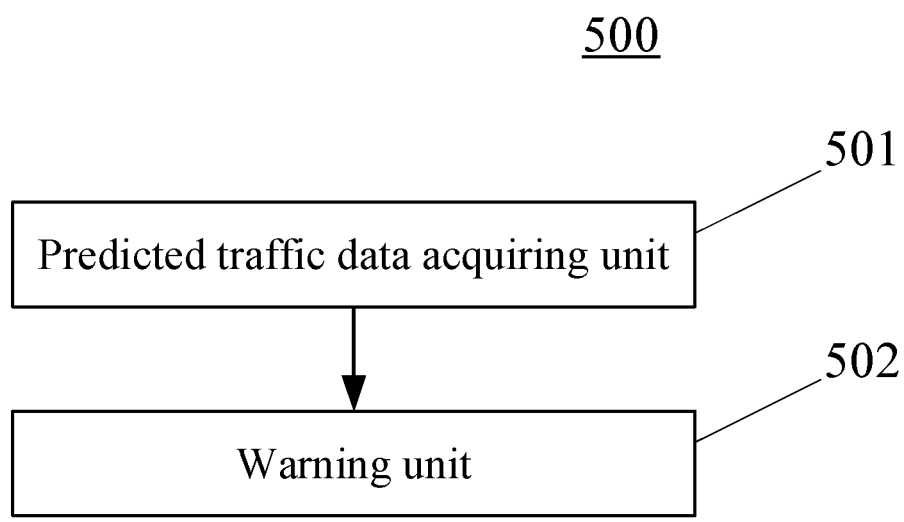
FIG. 5 is a schematic structural diagram of an embodiment of an apparatus for warning according to the present disclosure.

Further referring to FIG. 5, as an implementation of the method shown in the above drawings, the present disclosure provides an embodiment of an apparatus for warning. The embodiment of the apparatus corresponds to the embodiment of the method shown in FIG. 2, and the apparatus may be applied in various electronic devices.

As shown in FIG. 5, the apparatus 500 for warning in this embodiment may include: a predicted traffic data acquiring unit 501 and a warning unit 502. Where the predicted traffic data acquiring unit 501 is configured to import a real-time collected traffic data sequence into a pre-trained traffic prediction model, to obtain predicted traffic data. The traffic prediction model is used to calculate and obtain the predicted traffic data according to the real-time collected traffic data sequence. The warning unit 502 is configured to send, in response to a difference between the predicted traffic data and actual traffic data corresponding to time being greater than a set threshold, a warning signal.

In some alternative implementations of this embodiment, the traffic prediction model may include a convolutional neural network, a residual network and a fully connected layer.

In some alternative implementations of this embodiment, the predicted traffic data acquiring unit may include: a first feature vector acquiring subunit (not shown in the figure), a second feature vector acquiring subunit (not shown in the figure) and a predicted traffic data acquiring subunit (not shown in the figure). Here, the first feature vector acquiring subunit is configured to input the real-time collected traffic data sequence into the convolutional neural network, to obtain a feature vector of the real-time collected traffic data sequence, where the convolutional neural network is used to represent a corresponding relationship between the real-time collected traffic data sequence and the feature vector of the real-time collected traffic data sequence. The second feature vector acquiring subunit is configured to input the feature vector of the real-time collected traffic data sequence into the residual network, to obtain a fused feature vector of the feature vector of the real-time collected traffic data sequence, where the residual network is used to represent a corresponding relationship between the feature vector of the real-time collected traffic data sequence and the fused feature vector. The predicted traffic data acquiring subunit is configured to input the fused feature vector into the fully connected layer, to obtain the predicted traffic data of the real-time collected traffic data sequence, where the fully connected layer is used to represent a corresponding relationship between the fused feature vector and the predicted traffic data.

In some alternative implementations of this embodiment, the residual network may include a deep characteristic extraction network and a surface characteristic extraction network, where the deep characteristic extraction network includes at least two convolutional layers, and an output of a previous convolutional layer in the at least two convolutional layers is used as an input of a later convolutional layer adjacent to the previous convolutional layer.

In some alternative implementations of this embodiment, the apparatus 500 for warning includes a traffic prediction model training unit (not shown in the figure), configured to train a traffic prediction model. The traffic prediction model training unit may include: a sample acquiring subunit (not shown in the figure) and a traffic prediction model training subunit (not shown in the figure). The sample acquiring subunit is configured to extract sample traffic data sequences from historical data, to obtain a sample traffic data sequence set. The historical data is network traffic historical data when there is no failure, and there is a set time interval between adjacent sample traffic data in the sample traffic data sequence. The traffic prediction model training subunit is configured to use the sample traffic data sequences in the sample traffic data sequence set as an input, and use sample predicted traffic data corresponding to the sample traffic data sequences in the sample traffic data sequence set as an output, to train and obtain the traffic prediction model.

In some alternative implementations of this embodiment, the traffic prediction model training subunit may include: a traffic prediction model training module (not shown in the figure), configured to import sequentially the sample traffic data sequences in the sample traffic data sequence set into an initial traffic prediction model, to obtain initial predicted traffic data corresponding to the sample traffic data sequences in the sample traffic data sequence set; compare the initial predicted traffic data corresponding to the sample traffic data sequences in the sample traffic data sequence set with sample predicted traffic data corresponding to the sample traffic data sequences, to obtain a prediction accuracy of the initial traffic prediction model; determine whether the prediction accuracy is greater than a preset accuracy threshold; and use the initial traffic prediction model as a trained traffic prediction model if the prediction accuracy is greater than the preset accuracy threshold.

In some alternative implementations of this embodiment, the traffic prediction model training subunit may further include: a parameter adjusting module (not shown in the figure), configured to adjust, in response to the prediction accuracy being not greater than the preset accuracy threshold, a parameter of the initial traffic prediction model, and continue to perform the training.

In some alternative implementations of this embodiment, the traffic prediction model training module may include: an initial predicted traffic data acquiring submodule (not shown in the figure), configured to import, for each of the sample traffic data sequences in the sample traffic data sequence set, consecutive N pieces of sample traffic data in the sample traffic data sequence into the initial traffic prediction model, to obtain initial predicted traffic data corresponding to the N pieces of sample traffic data.

In some alternative implementations of this embodiment, the traffic prediction model training module may include: a sample predicted traffic data setting submodule (not shown in the figure), a marking submodule (not shown in the figure) and a prediction accuracy acquiring submodule (not shown in the figure). Here, the sample predicted traffic data setting submodule is configured to use (N+1)th piece of sample traffic data in the sample traffic data sequence as the sample predicted traffic data. The marking submodule is configured to mark, in response to a difference between the initial predicted traffic data and the sample predicted traffic data being less than a difference threshold, the initial predicted traffic data as correct. The prediction accuracy acquiring submodule is configured to statisticize a correct rate of the initial predicted traffic data corresponding to the sample traffic data sequence and obtained by the initial traffic prediction model, to obtain the prediction accuracy of the initial traffic prediction model.

The embodiment further provides a server. The server includes: one or more processors; and a memory storing one or more programs. The one or more programs, when executed by the one or more processors, cause the one or more processors to implement the method for warning.

The embodiment further provides a computer readable medium storing a computer program. The program, when executed by a processor, implements the method for warning.

Figure 6:
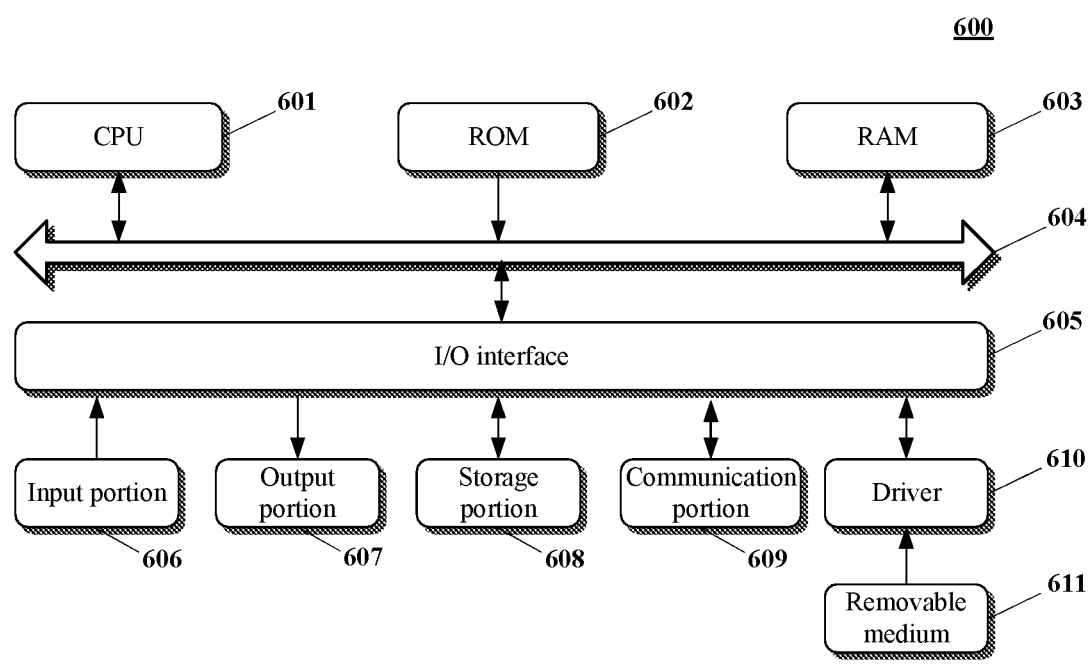
FIG. 6 is a schematic structural diagram of a computer system adapted to implement a server according to the embodiments of the present disclosure.

Referring to FIG. 6, FIG. 6 is a schematic structural diagram of a computer system 600 adapted to implement a server (e.g., the server 105 in FIG. 1) of the embodiments of the present disclosure. The computer system shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor including a predicted traffic data acquiring unit and a warning unit. Here, the names of these units do not in some cases constitute a limitation to such units themselves. For example, the warning unit may also be described as "a unit for sending a warning signal."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: import a real-time collected traffic data sequence into a pre-trained traffic prediction model, to obtain predicted traffic data, the traffic prediction model being used to calculate and obtain the predicted traffic data according to the real-time collected traffic data sequence; and send, in response to a difference between the predicted traffic data and actual traffic data corresponding to time being greater than a set threshold, a warning signal.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for warning, comprising:
importing a real-time collected traffic data sequence into a pre-trained traffic prediction model, to obtain predicted traffic data, the pre-trained traffic prediction model being used to calculate and obtain the predicted traffic data according to the real-time collected traffic data sequence; and
sending, in response to a difference between the predicted traffic data and actual traffic data corresponding to time being greater than a set threshold, a warning signal;
wherein the pre-trained traffic prediction model comprises a convolutional neural network, a residual network and a fully connected layer; and
wherein the residual network comprises a deep characteristic extraction network and a surface characteristic extraction network, wherein the deep characteristic extraction network of the residual network comprises at least two convolutional layers, and an output of a previous convolutional layer in the at least two convolutional layers is used as an input of a later convolutional layer adjacent to the previous convolutional layer.

2. The method according to claim 1, wherein the importing the real-time collected traffic data sequence into the pre-trained traffic prediction model, to obtain predicted traffic data comprises:
inputting the real-time collected traffic data sequence into the convolutional neural network, to obtain a feature vector of the real-time collected traffic data sequence, the convolutional neural network being used to represent a corresponding relationship between the real-time collected traffic data sequence and the feature vector of the real-time collected traffic data sequence;
inputting the feature vector of the real-time collected traffic data sequence into the residual network, to obtain a fused feature vector of the feature vector of the real-time collected traffic data sequence, the residual network being used to represent a corresponding relationship between the feature vector of the real-time collected traffic data sequence and the fused feature vector; and
inputting the fused feature vector of the feature vector of the real-time collected traffic data sequence into the fully connected layer, to obtain the predicted traffic data of the traffic data sequence collected in real-time, the fully connected layer being used to represent a corresponding relationship between the fused feature vector and the predicted traffic data.

3. The method according to claim 1, wherein the pre-trained traffic prediction model is trained and obtained by:
extracting sample traffic data sequences from historical data, to obtain a sample traffic data sequence set, wherein the historical data is network traffic historical data when there is no failure, and there is a set time interval between adjacent sample traffic data in each of the sample traffic data sequences; and
using the sample traffic data sequences in the sample traffic data sequence set as an input, and using sample predicted traffic data corresponding to the sample traffic data sequences in the sample traffic data sequence set as an output, to train and obtain the pre-trained traffic prediction model.

4. The method according to claim 3, wherein the using the sample traffic data sequences in the sample traffic data sequence set as an input, and using sample predicted traffic data corresponding to the sample traffic data sequences in the sample traffic data sequence set as an output, to train and obtain the pre-trained traffic prediction model comprises:
performing following training: importing sequentially the sample traffic data sequences in the sample traffic data sequence set into an initial traffic prediction model, to obtain initial predicted traffic data corresponding to the sample traffic data sequences in the sample traffic data sequence set; comparing the initial predicted traffic data corresponding to the sample traffic data sequences in the sample traffic data sequence set with sample predicted traffic data corresponding to the sample traffic data sequences, to obtain a prediction accuracy of the initial traffic prediction model; determining whether the prediction accuracy is greater than a preset accuracy threshold; and using the initial traffic prediction model as a trained traffic prediction model in response to the prediction accuracy of the initial traffic prediction model being greater than the preset accuracy threshold.

5. The method according to claim 4, wherein the using the sample traffic data sequences in the sample traffic data sequence set as an input, and using sample predicted traffic data corresponding to the sample traffic data sequences in the sample traffic data sequence set as an output, to train and obtain the pre-trained traffic prediction model further comprises:
adjusting, in response to the prediction accuracy of the initial traffic prediction model being not greater than the preset accuracy threshold, a parameter of the initial traffic prediction model, and continuing to perform the training.

6. The method according to claim 4, wherein the importing sequentially the sample traffic data sequences in the sample traffic data sequence set into an initial traffic prediction model, to obtain initial predicted traffic data corresponding to the sample traffic data sequences in the sample traffic data sequence set comprises:

importing, for each of the sample traffic data sequences in the sample traffic data sequence set, consecutive N pieces of sample traffic data in the sample traffic data sequence into the initial traffic prediction model, to obtain initial predicted traffic data corresponding to the N pieces of sample traffic data.

7. The method according to claim 6, wherein the comparing the initial predicted traffic data corresponding to the sample traffic data sequences in the sample traffic data sequence set with sample predicted traffic data corresponding to the sample traffic data sequences, to obtain a prediction accuracy of the initial traffic prediction model comprises:

using (N+1)th piece of sample traffic data in each of the sample traffic data sequences as the sample predicted traffic data;

marking, in response to a difference between the initial predicted traffic data and the sample predicted traffic data being less than a difference threshold, the initial predicted traffic data as correct; and statisticizing a correct rate of the initial predicted traffic data corresponding to the each of the sample traffic data sequences and obtained by the initial traffic prediction model, to obtain the prediction accuracy of the initial traffic prediction model.

8. An apparatus for warning, comprising:
at least one processor; and
a memory storing instructions, which when executed by the at least one processor, cause the at least one processor to perform operations comprising:

importing a real-time collected traffic data sequence into a pre-trained traffic prediction model, to obtain predicted traffic data, the pre-trained traffic prediction model being used to calculate and obtain the predicted traffic data according to the real-time collected traffic data sequence; and sending, in response to a difference between the predicted traffic data and actual traffic data corresponding to time being greater than a set threshold, a warning signal;

wherein the pre-trained traffic prediction model comprises a convolutional neural network, a residual network and a fully connected layer; and wherein the residual network comprises a deep characteristic extraction network and a surface characteristic extraction network, wherein the deep characteristic extraction network of the residual network comprises at least two convolutional layers, and an output of a previous convolutional layer in the at least two convolutional layers is used as an input of a later convolutional layer adjacent to the previous convolutional layer.

9. The apparatus according to claim 8, wherein the importing the real-time collected traffic data sequence into the pre-trained traffic prediction model, to obtain predicted traffic data comprises:

inputting the real-time collected traffic data sequence into the convolutional neural network, to obtain a feature vector of the real-time collected traffic data sequence, the convolutional neural network being used to represent a corresponding relationship between the real-time collected traffic data sequence and the feature vector of the real-time collected traffic data sequence;

inputting the feature vector of the real-time collected traffic data sequence into the residual network, to obtain a fused feature vector of the feature vector of the real-time collected traffic data sequence, the residual network being used to represent a corresponding relationship between the feature vector of the real-time collected traffic data sequence and the fused feature vector; and inputting the fused feature vector of the feature vector of the real-time collected traffic data sequence into the fully connected layer, to obtain the predicted traffic data of the traffic data sequence collected in real-time, the fully connected layer being used to represent a corresponding relationship between the fused feature vector and the predicted traffic data.

10. The apparatus according to claim 8, wherein the pre-trained traffic prediction model is trained and obtained by:

extracting sample traffic data sequences from historical data, to obtain a sample traffic data sequence set, wherein the historical data is network traffic historical data when there is no failure, and there is a set time interval between adjacent sample traffic data in each of the sample traffic data sequences; and using the sample traffic data sequences in the sample traffic data sequence set as an input, and using sample predicted traffic data corresponding to the sample traffic data sequences in the sample traffic data sequence set as an output, to train and obtain the pre-trained traffic prediction model.

11. The apparatus according to claim 10, wherein the using the sample traffic data sequences in the sample traffic data sequence set as an input, and using sample predicted traffic data corresponding to the sample traffic data sequences in the sample traffic data sequence set as an output, to train and obtain the pre-trained traffic prediction model comprises:

performing following training: importing sequentially the sample traffic data sequences in the sample traffic data sequence set into an initial traffic prediction model, to obtain initial predicted traffic data corresponding to the sample traffic data sequences in the sample traffic data sequence set; comparing the initial predicted traffic data corresponding to the sample traffic data sequences in the sample traffic data sequence set with sample predicted traffic data corresponding to the sample traffic data sequences, to obtain a prediction accuracy of the initial traffic prediction model; determining whether the prediction accuracy is greater than a preset accuracy threshold; and use the initial traffic prediction model as a trained traffic prediction model in response to the prediction accuracy of the initial traffic prediction model being greater than the preset accuracy threshold.

12. The apparatus according to claim 11, wherein the using the sample traffic data sequences in the sample traffic data sequence set as an input, and using sample predicted traffic data corresponding to the sample traffic data sequences in the sample traffic data sequence set as an output, to train and obtain the pre-trained traffic prediction model further comprises:

adjusting, in response to the prediction accuracy of the initial traffic prediction model being not greater than the preset accuracy threshold, a parameter of the initial traffic prediction model, and continue to perform the training.

13. The apparatus according to claim 11, wherein the importing sequentially the sample traffic data sequences in the sample traffic data sequence set into an initial traffic prediction model, to obtain initial predicted traffic data corresponding to the sample traffic data sequences in the sample traffic data sequence set comprises:

importing, for each of the sample traffic data sequences in the sample traffic data sequence set, consecutive N pieces of sample traffic data in the sample traffic data sequence into the initial traffic prediction model, to obtain initial predicted traffic data corresponding to the N pieces of sample traffic data.

14. The apparatus according to claim 13, wherein the comparing the initial predicted traffic data corresponding to the sample traffic data sequences in the sample traffic data sequence set with sample predicted traffic data corresponding to the sample traffic data sequences, to obtain a prediction accuracy of the initial traffic prediction model comprises:

using (N+1)th piece of sample traffic data in each of the sample traffic data sequences as the sample predicted traffic data;

marking, in response to a difference between the initial predicted traffic data and the sample predicted traffic data being less than a difference threshold, the initial predicted traffic data as correct; and statisticizing a correct rate of the initial predicted traffic data corresponding to the each of the sample traffic data sequences and obtained by the initial traffic prediction model, to obtain the prediction accuracy of the initial traffic prediction model.

15. A non-transitory computer readable medium, storing a computer program, wherein the program, when executed by a processor, causes the processor to perform operations comprising:

importing a real-time collected traffic data sequence into a pre-trained traffic prediction model, to obtain predicted traffic data, the pre-trained traffic prediction model being used to calculate and obtain the predicted traffic data according to the real-time collected traffic data sequence; and sending, in response to a difference between the predicted traffic data and actual traffic data corresponding to time being greater than a set threshold, a warning signal;

wherein the pre-trained traffic prediction model comprises a convolutional neural network, a residual network and a fully connected layer; and wherein the residual network comprises a deep characteristic extraction network and a surface characteristic extraction network, wherein the deep characteristic extraction network of the residual network comprises at least two convolutional layers, and an output of a previous convolutional layer in the at least two convolutional layers is used as an input of a later convolutional layer adjacent to the previous convolutional layer.

* * * * *